(12) United States Patent
Bates et al.

(10) Patent No.: US 8,288,979 B2
(45) Date of Patent: Oct. 16, 2012

(54) MOTOR CONTROL MECHANISM FOR ELECTRIC VEHICLES

(75) Inventors: Allen Keith Bates, Tucson, AZ (US);
Nhan Xuan Bui, Tucson, AZ (US);
Reed Alan Hancock, Tucson, AZ (US);
Wayne Isami Imaino, San Jose, CA (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 12/355,495

(22) Filed: Jan. 16, 2009

(65) Prior Publication Data

US 2010/0181949 A1   Jul. 22, 2010

(51) Int. Cl.
*H02P 7/00* (2006.01)

(52) U.S. Cl. ............ 318/432; 318/400.11; 318/249; 318/184; 318/400.09; 318/724; 310/186; 310/184; 360/73.08

(58) Field of Classification Search .......... 318/139; 320/127
See application file for complete search history.

(56) References Cited

U.S. PATENT DOCUMENTS

| | | | | |
|---|---|---|---|---|
| 4,167,692 A * | 9/1979 | Sekiya et al. | ............ | 318/400.41 |
| 4,890,049 A * | 12/1989 | Auinger | ........................ | 318/771 |
| 5,068,587 A * | 11/1991 | Nakamura et al. | ............ | 318/771 |
| 5,306,972 A * | 4/1994 | Hokanson et al. | ............... | 310/58 |
| 5,912,522 A * | 6/1999 | Rivera | ......................... | 310/184 |
| 6,215,261 B1 | 4/2001 | Becerra | | |
| 6,727,668 B1 | 4/2004 | Maslov et al. | | |
| 7,102,307 B2 | 9/2006 | Shao | | |
| 2005/0052080 A1* | 3/2005 | Maslov et al. | ............... | 307/10.1 |
| 2009/0160392 A1* | 6/2009 | Mularcik | ..................... | 318/724 |
| 2009/0295315 A1* | 12/2009 | Tarnow et al. | ................ | 318/380 |
| 2010/0052584 A1* | 3/2010 | Bates et al. | ............. | 318/400.11 |
| 2011/0205662 A1* | 8/2011 | Bates et al. | ................ | 360/73.08 |

FOREIGN PATENT DOCUMENTS

WO  WO-2007/089529   *  8/2007
WO  WO 2007089529 A2 *  8/2007

* cited by examiner

*Primary Examiner* — Walter Benson
*Assistant Examiner* — Jorge Carrasquillo
(74) *Attorney, Agent, or Firm* — Griffiths & Seaton PLLC

(57) ABSTRACT

An apparatus for controlling a wheel motor is provided. A plurality of switches is provided for controlling a direction of current through motor coils of the wheel motor. A brushless motor control circuit is connected to each of the plurality of switches. Responsive to a request to adjust one of an angular velocity and an angular acceleration of the wheel motor, the plurality of switches are activated to place the motor coils in a predetermined configuration to maximize torque or reduce a total back electromotive force (BEMF) from the motor coils.

14 Claims, 6 Drawing Sheets

MOTOR CONTROL MECHANISM FOR ELECTRIC VEHICLES

BACKGROUND OF THE INVENTION

1. Field of the Invention

The present invention generally relates to field of electronic systems. The present invention specifically relates to back electromotive force ("BEMF") voltage reduction in an electric motor used in vehicular settings.

2. Description of the Related Art

In recent years, advances in technology, as well as ever evolving tastes in style, have led to substantial changes in the design of automobiles. One of the changes involves the complexity of the electrical and drive systems within automobiles, particularly alternative fuel vehicles, such as hybrid, electric, and fuel cell vehicles. Such alternative fuel vehicles typically use an electric motor, perhaps in combination with another means of propulsion, to drive the wheels.

As the power demands on the electrical systems in alternative fuel vehicles continue to increase, there is an ever increasing need to maximize the electrical, as well as the mechanical, efficiency of such systems. Additionally, there is a constant desire to reduce the number components required to operate alternative fuel vehicles and minimize the overall cost and weight of the vehicles.

SUMMARY OF THE INVENTION

Alternative fuel vehicles frequently employ electric motors and feedback control systems with motor drivers for vehicle propulsion, particularly in hybrid settings. While the motors rotate, a back electromotive force ("BEMF") is produced by the electric motors. This BEMF voltage is produced because the electric motors generate an opposing voltage while rotating.

While electric motors in hybrid systems provide some energy savings, inefficiencies remain. For example, most vehicles continue to utilize a transmission mechanism to transfer power from a vehicle engine, be it gas or electric, to drive the wheels. In place of a conventional vehicle transmission system, a wheel motor system may be implemented where the electric motors are placed near, or essentially within, the wheels they are intended to drive. Using such systems, it may be possible to reduce, perhaps even eliminate, the need for any sort of transmission or driveline that couples the electric motor to the wheel.

Thus, a wheel motor has the potential to both increase mechanical efficiency and reduce the number of components. Such a wheel motor necessarily requires a control mechanism to substitute for the functionality provided by a conventional transmission, such as gear and braking functionality. Accordingly, a need exists for an apparatus, system, and method for control of a wheel motor to provide such functionality. Furthermore, other desirable features and characteristics of the present invention will become apparent from the subsequent detailed description and the appended claims, taken in conjunction with the accompanying drawings and the foregoing technical field and background.

Accordingly, in one embodiment, by way of example only, an apparatus for controlling a wheel motor is provided. A plurality of switches is provided for controlling a direction of current through motor coils of the wheel motor. A brushless motor control circuit is connected to each of the plurality of switches. Responsive to a request to adjust one of an angular velocity and an angular acceleration of the electric motor, the plurality of switches are activated to place the motor coils in a predetermined configuration to maximize torque or reduce a total back electromotive force (BEMF) from the motor coils.

In an additional embodiment, again by way of example only, a system for controlling a vehicle wheel motor is provided. One of a battery and a capacitor is provided. A controller is connected to the one of the battery and the capacitor. A plurality of switches is selectively activated by the controller for controlling a direction of current through motor coils of the wheel motor. During a first mode of operation, the plurality of switches are activated by the controller to place the motor coils in a serial configuration to maximize wheel motor torque. During a second mode of operation, the plurality of switches are activated by the controller to place the motor coils in one of a parallel configuration and a bypass configuration to reduce a total back electromotive force (BEMF) from the motor coils and increase angular velocity.

In an additional embodiment, again by way of example only, a method for controlling a wheel motor of a vehicle is provided. A request to adjust one of an angular velocity and an angular acceleration of the wheel motor is received. A plurality of switches for controlling a direction of current through motor coils of the wheel motor is activated. The plurality of switches is activated to place the motor coils in a predetermined configuration to maximize torque or reduce a total back electromotive force (BEMF) from the motor coils.

In still another embodiment, again by way of example only, a method of manufacturing a system for controlling a vehicle wheel motor is provided. One of a battery and a capacitor is provided. A controller connected to the one of the battery and the capacitor is provided. A plurality of switches is provided. The plurality of switches is adapted to be selectively activated by the controller for controlling a direction of current through motor coils of the wheel motor. The controller activates the plurality of switches during a first mode of operation to place the motor coils in a serial configuration to maximize wheel motor torque.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for wheel motor control in a vehicle. The mechanisms function to increase maximum vehicle wheel angular velocity by use of a motor control switching circuit. The motor control switching circuit reduces the total Back EMF (BEMF) produced by the wheel motor by placing the motor coils in a parallel configuration. When maximum velocity is needed, a portion of the motor coils is bypassed. Although bypassing a portion of the motor coils reduces the rotational acceleration capability of the motor because the torque constant of the motor is reduced in the effort to reduce the voltage constant of the motor, the motor control switching circuit is able to produce the necessary acceleration when needed by switching in the previously bypassed motor coils.

The mechanisms of the illustrated embodiments further function to maximize vehicle wheel torque (such as during vehicle acceleration and deceleration modes of operation) by the use of the motor control switching circuit, by selectively activating switches to place the motor coils in a serial coil configuration. Finally, the mechanisms provide dynamic braking functionality by shorting the motor coils as will be further described.

Use of the illustrated embodiments in a wheel motor setting may obviate the need for a conventional vehicle transmission system, saving weight and reducing energy consumption while increasing efficiency. As previously described, such embodiments may substitute for conventional transmission functionality by providing integrated gear and braking functionality.

Figure 1:
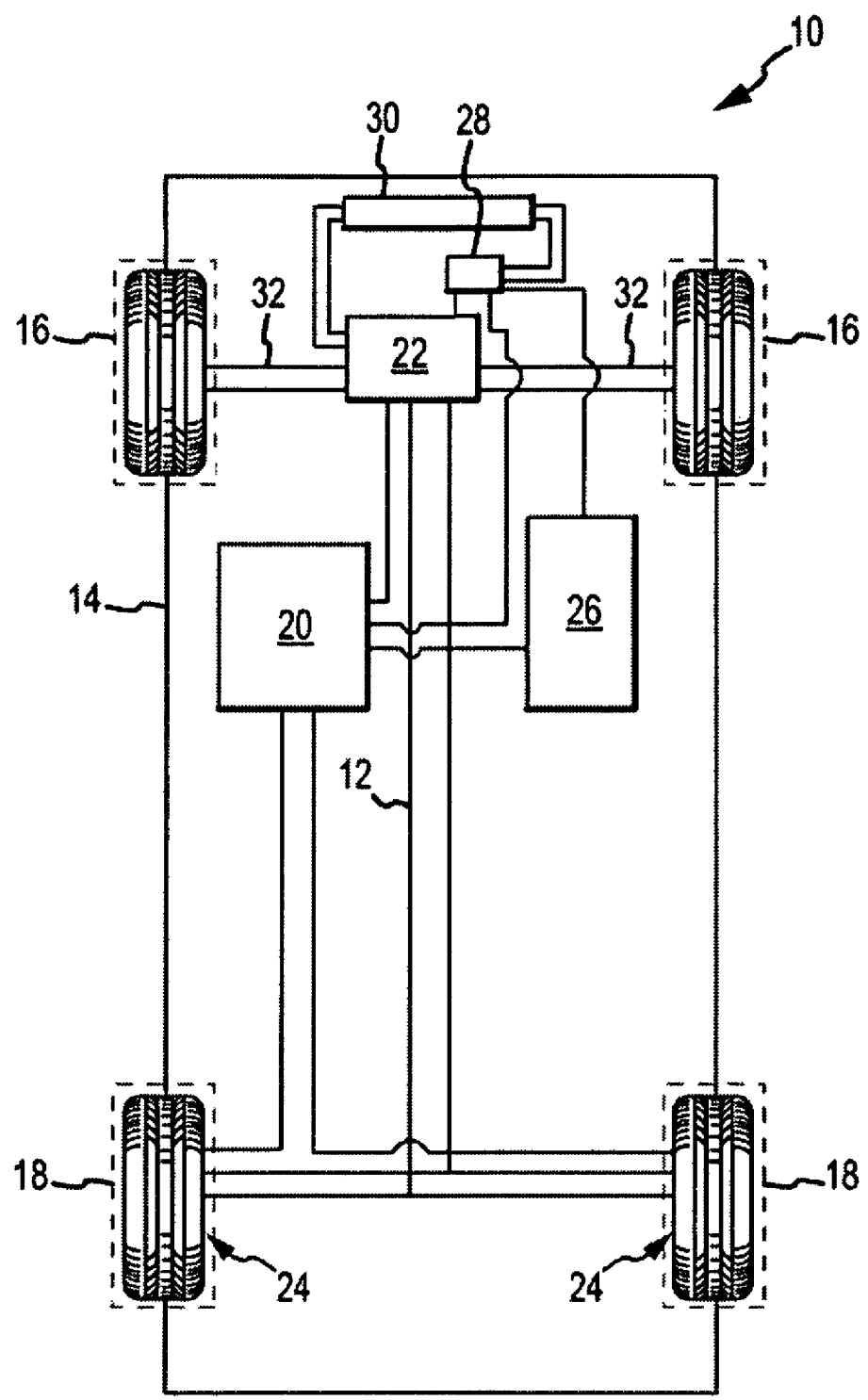
FIG. 1 is a diagram illustrating an exemplary hybrid vehicle.

In the exemplary embodiment illustrated in FIG. 1, motor vehicle 10 is a hybrid vehicle, and further includes an internal combustion engine 22, wheel motors (or wheel assemblies) 24, a battery/capacitor(s) 26, a power inverter (or inverter) 28, and a radiator 30. The internal combustion engine 22 is mechanically coupled to the front wheels 16 through drive shafts 32 through a transmission (not shown). Each of the wheel motors 24 is housed within one of the rear wheel assemblies 18. The battery 26 is coupled to an electronic control system 20 and the inverter 28. The radiator 30 is connected to the frame at an outer portion thereof and although not illustrated in detail, includes multiple cooling channels thereof that contain a cooling fluid (i.e., coolant) such as water and/or ethylene glycol (i.e., "antifreeze") and is coupled to the engine 22 and the inverter 28. Although not illustrated, the power inverter 28 may include a plurality of switches, or transistors, as is commonly understood. Battery 26 may be replaced (or augmented) with one or more capacitors 26 to store electrical charge.

The electronic control system 20 is in operable communication with the engine 22, the wheel motors 24, the battery 26, and the inverter 28. Although not shown in detail, the electronic control system 20 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below. The type of vehicle 10 shown in FIG. 1 is for illustrative purposes only and the invention may be employed with other types of vehicles (for example, an electric-only vehicle).

As the skilled artisan will appreciate, the angular velocity of wheels 18 (and therefore wheel motors 24) varies as the vehicle 10 moves. For example, as the vehicle is starting from a stopped position, the angular velocity of wheels 16, 18 is lower than when the vehicle is cruising at a fixed rate of speed. The higher the angular velocity, the higher corresponding BEMF is produced in the wheel motors. BEMF may be defined as the angular velocity W of the wheel motor multiplied by the voltage constant Kvoltage of the wheel motor, which is equal to the torque constant Ktorque of the wheel motor when SI (metric) units are employed. It is the enclosed invention which reduces these two constants by using selective switching to bypass motor coils, in order to reduce the BEMF:

$$\text{BEMF} = K\text{voltage} * W \quad (1).$$

The rotational acceleration capability of the wheel motor is reduced per equation (2), following, when selectively bypassing motor coils because the torque constant Ktorque of the wheel motor is reduced at the same time that the voltage constant Kvoltage is reduced. Reduction of the torque constant Ktorque reduces the torque provided (assuming the current remains the same) by the wheel motor, and that torque divided by the rotational inertia of the motor and wheel gives the rotational acceleration of the wheel motor and corresponding wheel per equation (3), following. However, these bypassed coils may be selectively re-engaged when that higher acceleration (or deacceleration) is desired, preferably when the angular velocity of the motor is in the range which permits an increase in back EMF (BEMF).

$$\text{Torque} = K\text{torque} * \text{Motor\_Current} \quad (2).$$

$$\text{Rotational Acceleration} = \text{Torque}/(\text{Rotational Inertia of Motor} + \text{Vehicle Inertia}) \quad (4).$$

Figure 2:
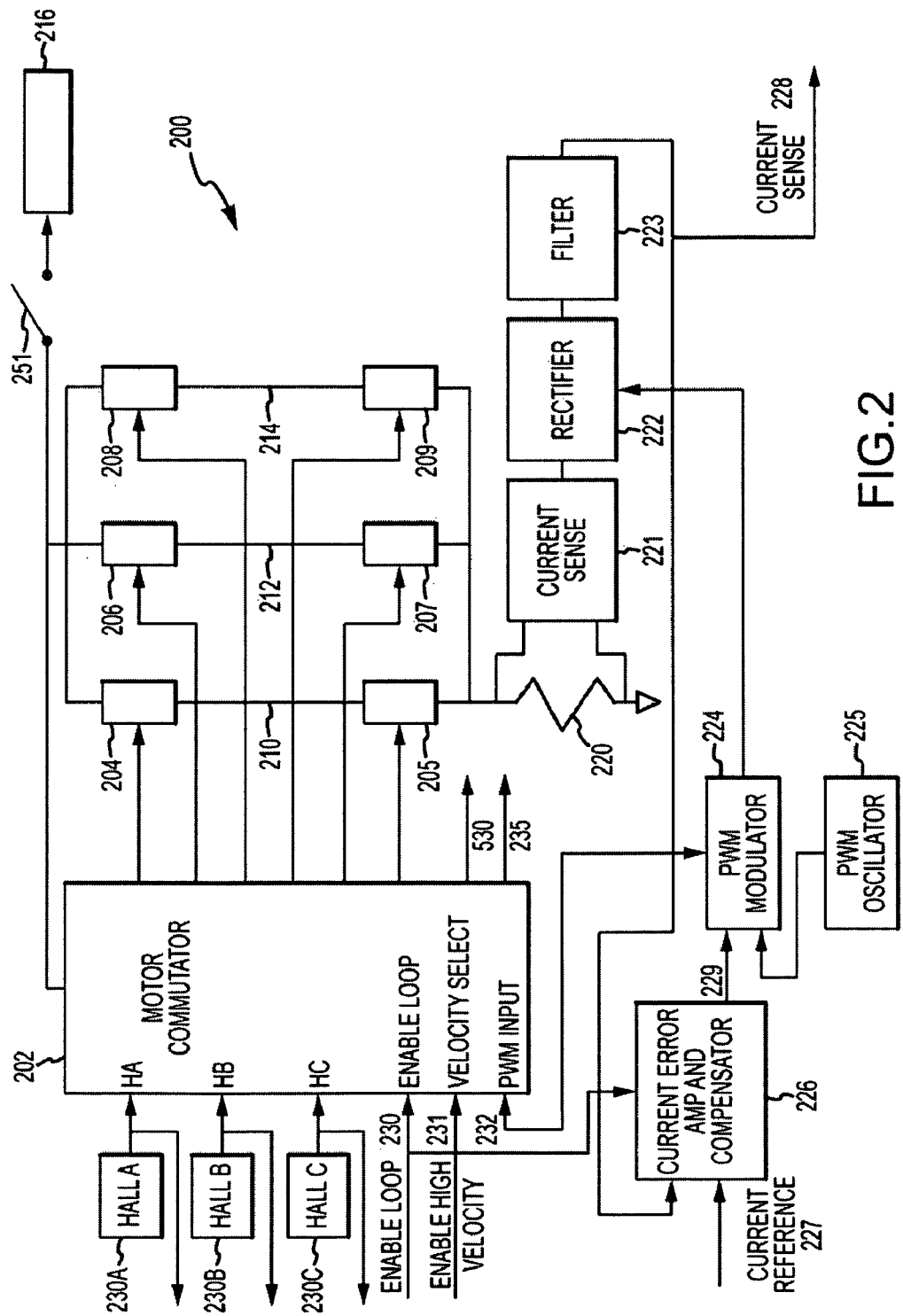
FIG. 2 is a block diagram of a motor control or driver circuit for a wheel motor.

FIG. 2 is a block diagram of a motor control or driver circuit 200 for brushless DC wheel motors for operation of the disclosed invention. A commutator 202 provides gate control for a set of power switches, such as FET switches 204, 205, 206, 207, 208 and 209, which, in turn, connect/disconnect the motor windings 210, 212 and 214 to/from a motor power supply 216 using switch 251. Sense resistor 220, current sense 221, rectifier 222 and filter 223 provide current sense signal 228 to current error amp and compensator 226.

Figure 4:
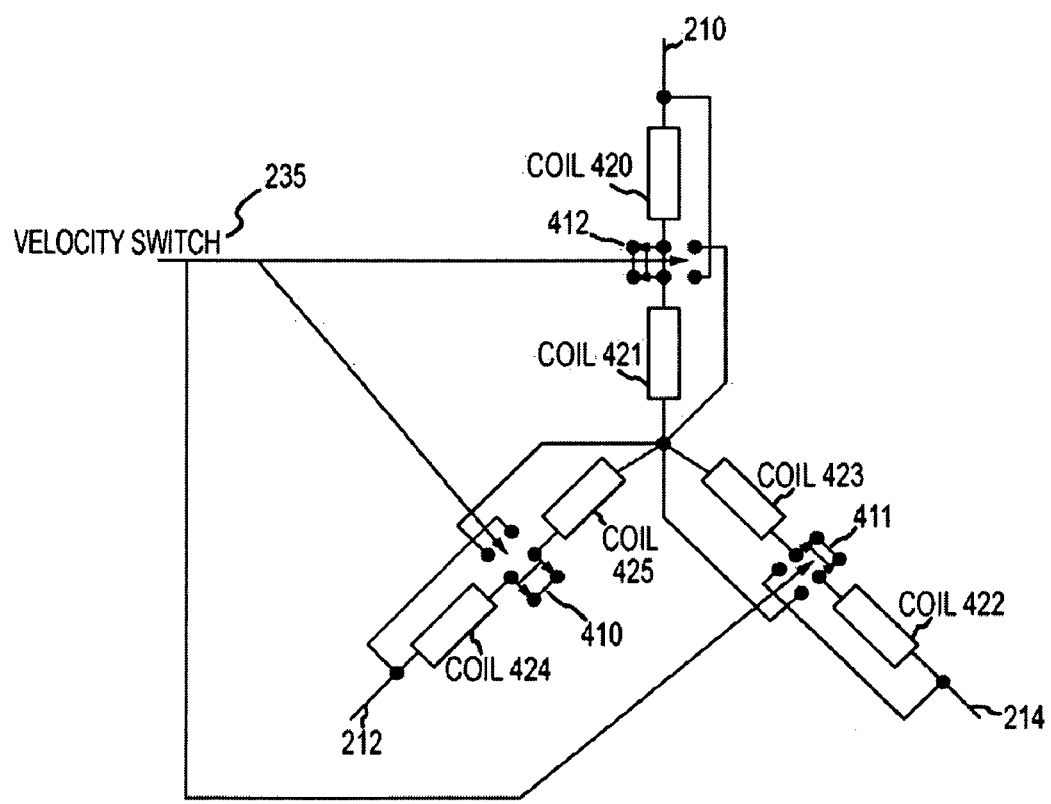
FIG. 4 is a first embodiment of motor coils with velocity switches.
Figure 5:
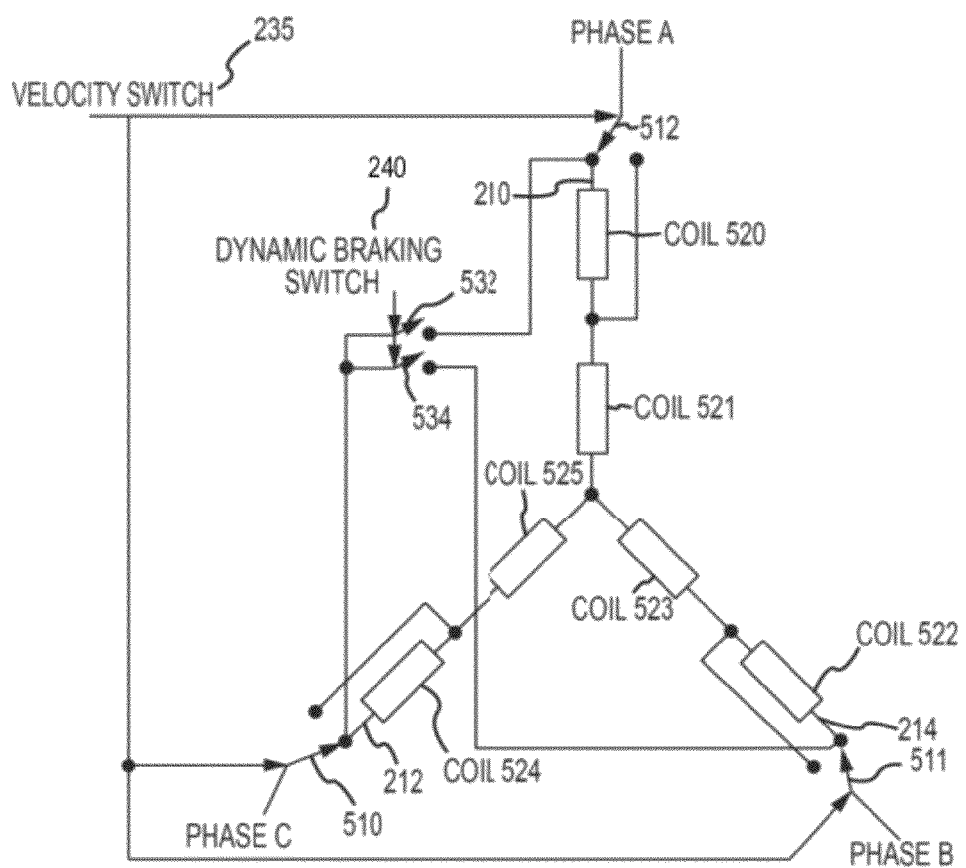
FIG. 5 is a second embodiment of motor coils with velocity switches and dynamic braking switches.

Current error amp and compensator 226 compares current sense signal 228 to current reference 227 and provides an error signal 229 to Pulse Width Modulation (PWM) modulator 224. Current error amp and compensator 226 also provides servo loop compensation to ensure a stable feedback loop for PWM modulator 224. Commutator 202 accepts hall sensor inputs HA, HB, HC from hall sensors 230A, 230B, and 230C, respectively. Commutator 202 also accepts enable loop 230, Enable high velocity 231 which provides Velocity select input, PWM input 232 to control the wheel motors 306 and 308 (FIG. 3) using FET switches 204, 205, 206, 207, 208 and 209. Velocity switch output 235 controls velocity switches 410, 411, 412, and 510, 511, and 512 (FIGS. 4, 5). Dynamic brake switch output 240 controls dynamic braking switches 532 and 534 (FIG. 5). PWM oscillator 225 also provides input to PWM 224.

Figure 3:
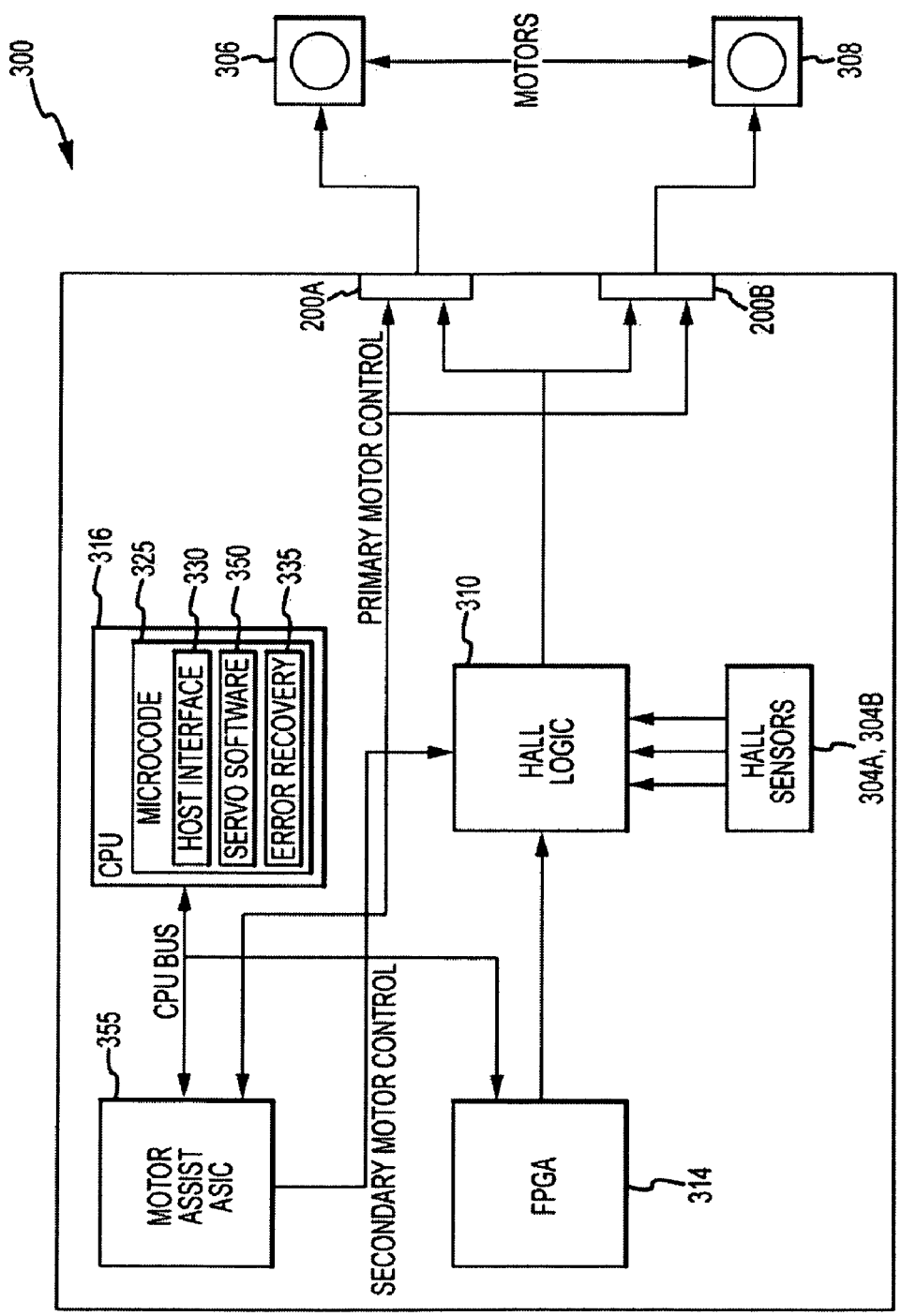
FIG. 3 is a portion of control circuit.

FIG. 3 is an exemplary block diagram of a portion 300 of the electronic control system 20 (FIG. 1) in which the velocity switch system of the present invention may be incorporated. Motor driver circuits 200A and 200B are coupled to the two wheel motors 306 and 308, respectively. Wheel motors 306 and 308, drive wheels 18 (FIG. 1). Hall sensors 304A and 304B are coupled to the two wheel motors 306 and 308, respectively.

The output from hall sensors 304A and 304B are coupled to hall sensor detection logic 310. During normal servo operation hall sensor detection logic 310 decodes the output signals from hall sensors 304A and 304B to provide motor rotation information for servo software 350. Hall sensor detection logic 310 may be implemented for example by software, firmware, hardware circuits (such as a field programmable gate array (FPGA) 314 as shown), a CPU, ASIC, etc., or a combination thereof. Servo software 350 processes the output from hall sensor detection logic 310 using control system laws to produce primary motor control signals that are transferred through motor assist ASIC (Application Specific Integrated Circuit) 355 and delivered to motor driver circuits 200A and 200B. Motor assist ASIC 355 provides current control logic.

Servo software 350 operates within the microcode section 325 of CPU 316. Other software components, including, host interface 330 and error recovery 335 also operate within the microcode section 325 of CPU 316. Host interface 330 provides communication between external hosts and CPU 316. Error recovery 335 provides software procedures to enable CPU 316 to direct operations to recover from errors that may occur during operation of the wheel motor.

FIG. 4 shows a first embodiment of velocity control switches 410-412 with motor coils 420-425. Switches 410, 411, and 412 are shown in a position to enable serial connection of motor coils 420-425. During acceleration or deceleration of the wheel motor, Velocity switch output 235 activates and controls velocity switches 410, 411, and 412 in a position to enable serial connection of motor coils 420-425. This provides the maximum torque from wheel motors 306 and 308.

During periods of higher angular velocity, Velocity switch output 235 controls velocity switches 410, 411, and 412 in a position to enable parallel connection of motor coils 420-425. This provides the minimum BEMF to allow the maximum velocity from wheel motors 306 and 308.

FIG. 5 shows a second embodiment of velocity control switches 510-512 with motor coils 520-525. Switches 510, 511, and 512 are shown in a position to enable serial connection of motor coils 520-525. During acceleration or deceleration, velocity switch output 235 controls velocity switches 510, 511, and 512 in a position to enable serial connection of motor coils 520-525. This provides the maximum torque from wheel motors 306 and 308.

During periods of higher velocity, velocity switch output 235 controls velocity switches 510, 511, and 512 in a position to enable bypass of motor coils 520, 522, and 524 (coils 520, 522, and 524 are left open). This provides the minimum BEMF to allow the maximum angular velocity from wheel motors 306 and 308.

The motor coils in FIG. 5 may function as a generator during a deceleration of the vehicle, acting to charge the battery/capacitor(s) 26. In this way, the wheels 18 (FIG. 1) are driving the wheel motors 24, instead of the wheel motors 24 driving the wheels. During such an operation current reference 227 (FIG. 2) is set to zero.

Dynamic braking switch output 530 controls dynamic braking switches 532 and 534. During a braking period (in which the vehicle needs to be stopped quickly), dynamic braking switches are enabled (closed) to short the motor coils 520, 521, 522, 523, 524, and 525, forcing the generator voltage to zero volts. In this way, the wheel motors mechanically assist in braking the vehicle as the skilled artisan will appreciate.

Figure 6:
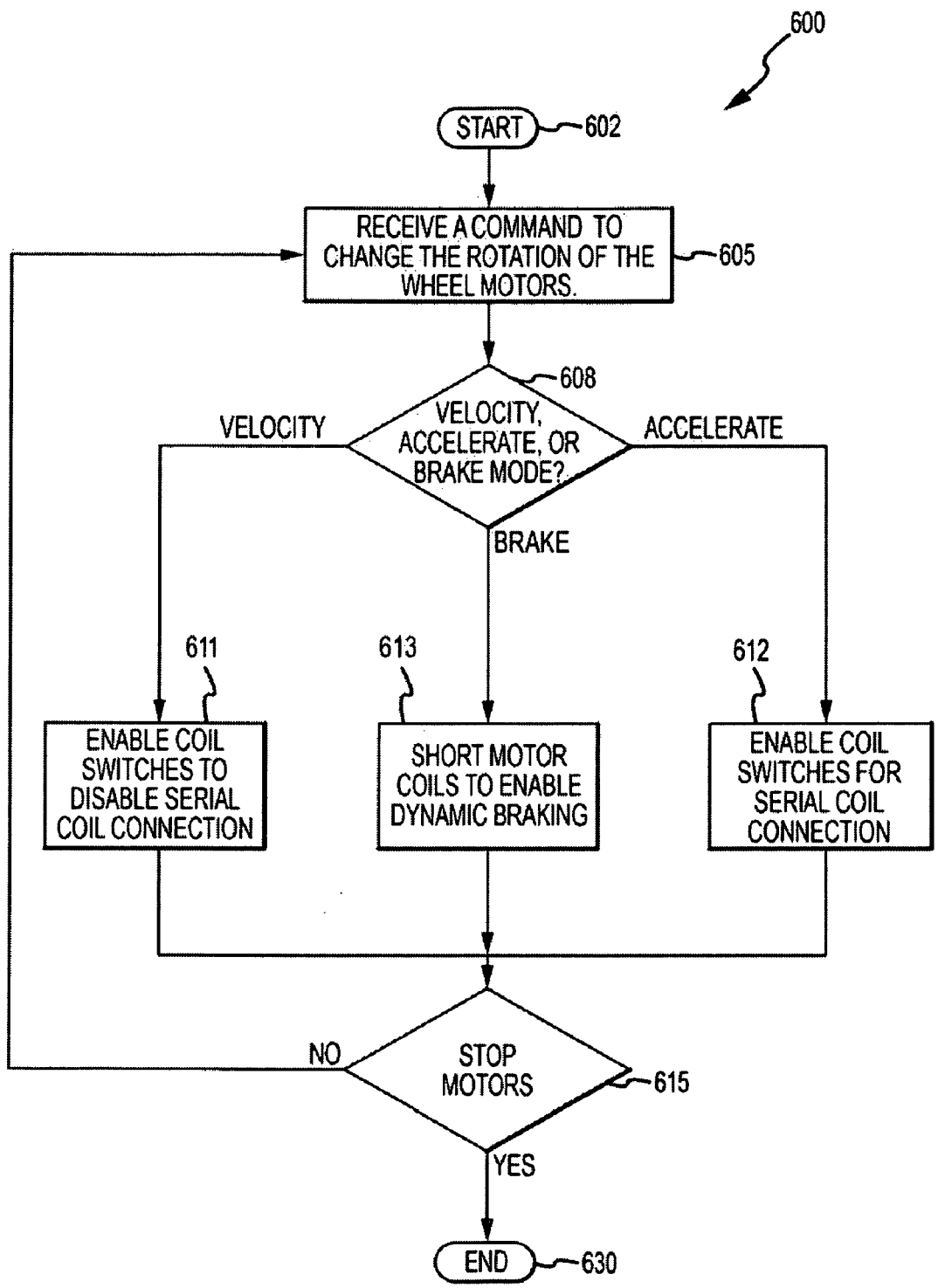
FIG. 6 is an exemplary flowchart for operation.

Turning to FIG. 6, an exemplary method of operation incorporating the mechanisms of the present invention is depicted. As one skilled in the art will appreciate, various steps in the method may be implemented in differing ways to suit a particular application. In addition, the described method may be implemented by various means, such as hardware, software, firmware, or a combination thereof. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

FIG. 6 shows an exemplary flowchart 600 for operation. At step 605, control circuit 200 receives a command change the rotation of wheel motors 306 and 308 (FIG. 3). If at step 608, the vehicle requires an accelerate mode of operation (increased torque), then step 612 is executed to enable velocity control switches 510-512 for serial coil connection. If at step 608, the wheel motor requires a velocity mode of operation (less torque and higher angular velocity), then step 611 is executed to disable velocity control switches 510-512 for serial coil connection. If at step 608, the wheel motor requires a braking mode of operation (dynamic braking), then step 613 is executed to short the motor coils as previously described.

Control flows from step 611, 612, or 613 to step 615. At step 615, wheel motors 306 and 308 are stopped, then control flows to step 630 to end, otherwise control flows to step 610, to receive another command.

In light of the foregoing, an exemplary operation of a vehicle may proceed as follows. The vehicle may first be at a stopped position, and a request may be received to accelerate in a startup mode of operation. Since a larger torque is useful in this situation, the velocity control switches are activated for serial coil connection, giving the vehicle higher torque with all coils (520-525) engaged at startup. As the vehicle increases in speed, selectively more coils (e.g., 520, 522, 524) are disengaged to allow the vehicle to increase in speed by reducing the BEMF of the wheel motors.

Continuing the example above further, as the vehicle slows down, the previously selectively disengaged are re-engaged (again 520, 522, and 524), so that the vehicle may either speed up with additional torque or, if the vehicle is in a non-dynamic braking mode of operation, more energy may be generated by the wheel motor (now acting as a generator) to recharge the vehicle's battery. If the vehicle needs to be stopped quickly, dynamic braking may be engaged by shorting the motor coils, again as previously indicated. In certain embodiments, more than two motor coils per phase may be used to provide multiple maximum velocities for a given motor and power supplies.

The mechanisms of the present invention may be adapted for a variety of vehicle systems including a variety of electronic control systems for wheel motors, as one skilled in the art will anticipate. While one or more embodiments of the present invention have been illustrated in detail, the skilled artisan will appreciate that modifications and adaptations to those embodiments may be made without departing from the scope of the present invention as set forth in the following claims.

What is claimed is:

1. A system for controlling a vehicle wheel motor, comprising:
   a velocity switch;
   a first phase comprising:
     a first switch coupled to the velocity switch,
     a first coil coupled to the first switch,
     a second coil, and
     a first node coupled between the first coil and the second coil, the first node further coupled to the first switch;
   a second phase comprising:
     a second switch coupled to the velocity switch,
     a third coil coupled to the second switch,
     a fourth coil, and
     a second node coupled between the third coil and the fourth coil, the second node further coupled to the second switch;

a third phase comprising:
    a third switch coupled to the velocity switch,
    a fifth coil coupled to the third switch,
    a sixth coil, and
    a third node coupled between the fifth coil and the sixth coil, the third node further coupled to the third switch;
a fourth node coupled to the second coil, the fourth coil, and the sixth coil;
a fifth node coupled between the third switch and the fifth coil;
a fourth switch coupled between the fifth node and the third coil; and
a fifth switch coupled between the fifth node and the first coil, the fourth switch and the fifth switch forming a dynamic braking switch, wherein:
    a current is bi-directional through the first phase, the second phase, and the third phase,
    the first switch, the second switch, and the third switch are configured to selectively place the first phase, the second phase, and the third phase in a first configuration to maximize wheel motor torque or in a second configuration to reduce a total back electromotive force (BEMF) from each motor coil,
    in the first configuration, the first switch, the second switch, and the third switch are selectively in a first position to place the first coil, the second coil, the third coil, the fourth coil, the fifth coil, and the sixth coil in a serial configuration to maximize the wheel motor torque, and
    in the second configuration, the first switch, the second switch, and the third switch are selectively in a second position to place the first coil, the second coil, the third coil the fourth coil, the fifth coil, and the sixth coil in a parallel configuration to reduce the total BEMF and increase the angular velocity in the first phase, the second phase, and the third phase.

2. The system of claim 1, further comprising a controller coupled to the first switch, the second switch and the third switch, wherein the controller is configured to transmit a request to adjust the angular velocity and an angular acceleration of the motor wheel, and the first switch, the second switch, and the third switch are positioned to connect the first phase, the second phase, and the third phase in the parallel configuration to reduce the total BEMF from the first coil, the second coil, the third coil, the fourth coil, the fifth coil, and the sixth coil to allow for greater angular velocity.

3. The system of claim 1, further comprising a controller coupled to the first switch the second switch and the third switch, wherein the controller is configured to transmit a request to adjust the angular velocity and an angular acceleration of the motor wheel and the first switch, the second switch, and the third switch are positioned to bypass an electrical connection to at least one of the first coil, the second coil, the third coil, the fourth coil, the fifth coil, and the sixth coil to provide a minimum back EMF and to maximize angular velocity.

4. The system of claim 1, further comprising a controller coupled to the first switch the second switch and the third switch, wherein the controller is configured to transmit a request to adjust the angular velocity and an angular acceleration of the motor wheel to one of increase or decrease the angular acceleration, and the first switch, the second switch, and the third switch are positioned to connect the first coil, the second coil, the third coil, the fourth coil, the fifth coil, and the sixth coil in the serial configuration to maximize torque.

5. The system of claim 1, wherein responsive to a request to stop the motor wheel, the first switch, the second switch, and the third switch are activated to short the first coil, the second coil, the third coil, the fourth coil, the fifth coil, and the sixth coil to provide dynamic braking.

6. The system of claim 1, further comprising:
    a power source; and
    a controller coupled to the power source, wherein the first switch, the second switch, and the third switch are selectively activated by the controller to further place the system in a third configuration and, in the third configuration, the first switch, the second switch, and the third switch are activated by the controller to place the first phase, the second phase, and the third phase in a bypass configuration to reduce a total back electromotive force (BEMF) from the first coil, the second coil, the third coil, the fourth coil, the fifth coil, and the sixth coil and to maximize angular velocity.

7. The system of claim 6, wherein the power source is a battery.

8. The system of claim 6, wherein the power source is a capacitor.

9. The system of claim 1, wherein the first switch, the second switch, and the third switch are selectively activated by the controller to further place the system in a third configuration and, in the third configuration, the first switch, the second switch, and the third switch are activated by the controller to short the first and second coil, the third and fourth coil, and the fifth and sixth coil, respectively, to provide dynamic braking and recharging to the power source.

10. The system of claim 9, wherein the power source is a battery.

11. The system of claim 9, wherein the power source is a capacitor.

12. The system of claim 1, further including a power inverter connected between the power source and the controller.

13. The system of claim 12, wherein the power source is a battery.

14. The system of claim 12, wherein the power source is a capacitor.

* * * * *